(12) United States Patent
Ishida (10) Patent No.: US 8,187,127 B2
(45) Date of Patent: May 29, 2012

(54) BELT-TYPE CONTINUOUSLY VARIABLE TRANSMISSION AND STRADDLE-TYPE VEHICLE EQUIPPED WITH THE SAME

(75) Inventor: Yousuke Ishida, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 0 days.

(21) Appl. No.: 11/946,726

(22) Filed: Nov. 28, 2007

(65) Prior Publication Data

US 2008/0125257 A1    May 29, 2008

(30) Foreign Application Priority Data

Nov. 29, 2006   (JP) ................................ 2006-322066

(51) Int. Cl.
*F16H 7/02* (2006.01)
*B62K 11/00* (2006.01)

(52) U.S. Cl. .................. 474/46; 474/8; 474/12; 474/13; 474/14; 474/19; 474/33; 474/35; 474/37; 474/40; 180/219; 180/230

(58) Field of Classification Search ............. 474/46, 474/14, 8, 12–13, 15–16, 19, 38, 43, 144, 474/264; *F16H 9/18, 7/02; B62K 11/00*
See application file for complete search history.

(56) References Cited

U.S. PATENT DOCUMENTS

| | | | | |
|---|---|---|---|---|
| 2,803,143 A | * | 8/1957 | Michie | 474/40 |
| 3,616,706 A | * | 11/1971 | Shimamoto | 474/19 |
| 4,088,036 A | * | 5/1978 | Hillman | 474/12 |
| 4,345,664 A | * | 8/1982 | Anno et al. | 180/230 |
| 4,360,353 A | * | 11/1982 | Hattori et al. | 474/12 |
| 4,857,033 A | * | 8/1989 | Czarka | 474/14 |
| 6,406,390 B1 | | 6/2002 | Roby | |
| 6,421,903 B2 | | 7/2002 | Brown | |
| 6,958,024 B2 | * | 10/2005 | Takano | 474/14 |
| 6,962,543 B2 | | 11/2005 | Roby | |
| 6,994,643 B2 | * | 2/2006 | Kalies | 474/46 |
| 7,090,600 B2 | | 8/2006 | Lohr | |
| 2002/0019280 A1 | * | 2/2002 | Brown | 474/35 |
| 2005/0090341 A1 | | 4/2005 | Lohr | |
| 2005/0239585 A1 | * | 10/2005 | Nishida et al. | 474/19 |

FOREIGN PATENT DOCUMENTS

| | | |
|---|---|---|
| DE | 102005037941 A1 | 3/2006 |
| GB | 2354805 A | 4/2001 |
| JP | 01040760 A | 2/1989 |
| JP | 05060192 * | 8/1991 |
| JP | 06201007 A * | 7/1994 |
| JP | 2001003723 A | 1/2001 |
| WO | WO 03/085278 A1 | 10/2003 |

OTHER PUBLICATIONS

European Search report for corresponding European application 07254513.0 lists the references above, Mar. 19, 2008.

* cited by examiner

*Primary Examiner* — Robert A Siconolfi
*Assistant Examiner* — San Aung
(74) *Attorney, Agent, or Firm* — Rabin & Berdo, PC

(57) ABSTRACT

A belt-type continuously variable transmission (CVT) with reduced vibration at high engine speeds. A secondary sheave includes a fixed sheave member, a moving sheave member, a compression coil spring, and an outside spring guide. The compression coil spring urges the moving sheave member toward the fixed sheave member. The outside spring guide prevents the compression coil spring from buckling during compression.

35 Claims, 7 Drawing Sheets

BELT-TYPE CONTINUOUSLY VARIABLE TRANSMISSION AND STRADDLE-TYPE VEHICLE EQUIPPED WITH THE SAME

RELATED APPLICATIONS

This application claims the benefit of priority under 35 USC 119 of Japanese patent application no. 2006-322066, filed on Nov. 29, 2006, which application is hereby incorporated by reference in its entirety.

BACKGROUND OF THE INVENTION

1. Field of the Invention

The present invention relates to a belt-type continuously variable transmission for a straddle-type vehicle.

2. Description of Related Art

A straddle-type vehicle equipped with a belt-type continuously variable transmission (CVT) is known in the art (for example, refer to WO2003-085278). The CVT includes a primary sheave to which a driving force from the engine is transmitted and a secondary sheave to which the driving force is transmitted from the primary sheave via a belt. At least one of the primary and secondary sheaves is variable in belt winding diameter, so that a speed change ratio can be controlled by varying the ratio of the belt winding diameter of the primary sheave to that of the secondary sheave.

Figure 7:
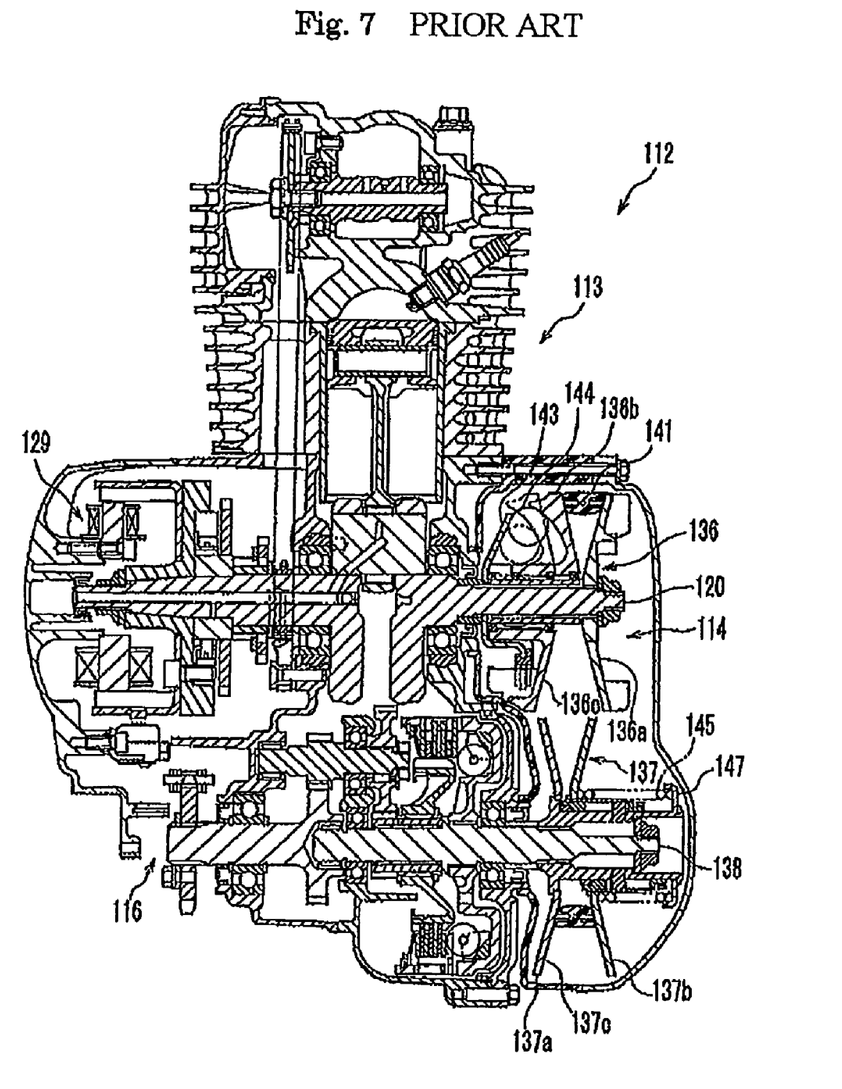
FIG. 7 is a sectional view of the conventional engine unit of WO2003-085278.

FIG. 7 is a sectional view of a conventional engine unit 112 described in WO2003-085278. Engine unit 112 includes an engine 113, a belt-type continuously variable transmission (CVT) 114, a reduction mechanism 116, and a generator 129. CVT 114 includes a primary sheave 136, a secondary sheave 137, and a belt 141.

Primary sheave 136 is unrotatably fixed to a crankshaft 120. Primary sheave 136 includes a primary fixed sheave member 136a and a primary moving sheave member 136b. Primary moving sheave member 136b is opposed to primary fixed sheave member 136a. Primary moving sheave member 136b and primary fixed sheave member 136a constitute a substantially V-cross-section belt groove 136c around which belt 141 is wound. Primary moving sheave member 136b can be moved relative to primary fixed sheave member 136a along the axis of crankshaft 120.

A cam plate 143 is disposed on the end of primary moving sheave member 136b opposite to primary fixed sheave member 136a and faces primary moving sheave member 136b. Cam plate 143 is tapered radially outward from primary sheave 136 so as to come close to primary moving sheave member 136b. A plurality of roller weights 144 is provided between primary moving sheave member 136b and cam plate 143. Roller weights 144 are displaced in the direction of the radius of primary sheave 136 and revolve around crankshaft 120 with rotation of primary moving sheave member 136b and cam plate 143.

Secondary sheave 137 is unrotatably mounted to a secondary sheave shaft 138. Like primary sheave 136, secondary sheave 137 includes a secondary fixed sheave member 137a and a secondary moving sheave member 137b. Secondary moving sheave member 137b is opposed to secondary fixed sheave member 137a. Secondary moving sheave member 137b and secondary fixed sheave member 137a constitute a substantially V-cross-section belt groove 137c around which belt 141 is wound. Secondary moving sheave member 137b can be moved relative to secondary fixed sheave member 137a along the axis of secondary sheave shaft 138.

A spring stopper 147 is disposed on the end of secondary moving sheave member 137b opposite to secondary fixed sheave member 137a. Spring stopper 147 is mounted to secondary sheave shaft 138 and cannot be moved relative to secondary fixed sheave member 137a along the axis of secondary sheave shaft 138. A compression coil spring 145 is disposed between spring stopper 147 and secondary moving sheave member 137b. Compression coil spring 145 urges secondary moving sheave member 137b in the direction in which belt groove 137c decreases in width, that is, the direction in which the distance between secondary moving sheave member 137b and secondary fixed sheave member 137a decreases.

When the rotation speed of primary sheave 136 (the rotation speed of engine 113) is low, the width of belt groove 137c is held small by the urging force of compression coil spring 145. Therefore, the winding diameter of belt 141 on secondary sheave 137 is relatively large and belt 141 is drawn to secondary sheave 137. Thus, roller weights 144 are held close to the rotation axis so that the width of belt groove 136c of primary sheave 136 is held relatively large. This results in a high speed change ratio.

When the rotation speed of primary sheave 136 increases, the centrifugal force generated at roller weights 144 also increases. Therefore, the pressure of roller weights 144 onto primary moving sheave member 136b overcomes the urging force of compression coil spring 145, so that primary moving sheave member 136b is moved toward primary fixed sheave member 136a. In addition, compression coil spring 145 is compressed to increase the width of belt groove 137c of secondary sheave 137. Thus, the belt winding diameter of primary sheave 136 increases, while the belt winding diameter of secondary sheave 137 decreases. Accordingly, the speed change ratio decreases as the rotation speed of primary sheave 136, that is, the rotation speed of engine 113, increases.

Conventional CVTs have a problem in that a great amount of vibration is generated, particularly while the engine runs at high rpm.

SUMMARY OF THE INVENTION

The present invention has been made in light of these circumstances and provides a CVT in which vibrations are reduced while the engine runs at high rpm.

A first belt-type continuously variable transmission according to the invention includes a primary sheave, a secondary sheave, and a belt wound around the primary and secondary sheaves. The secondary sheave includes a first sheave member, a second sheave member, a coil spring and a restricting member. The second sheave member is opposed to the first sheave member. The second sheave member is displaced along the axis of the first sheave member. The second and first sheave members constitute a belt groove around which the belt is wound. The coil spring urges the second sheave member toward the first sheave member. The restricting member prevents the coil spring from buckling during decompression or compression.

A second belt-type continuously variable transmission according to the invention includes a primary sheave, a secondary sheave, and a belt wound around the primary and secondary sheaves. The secondary sheave has a first sheave member, a second sheave member, a compression coil spring and a restricting member. The second sheave member is opposed to the first sheave member. The second sheave member is displaced along the axis of the first sheave member. The second and first sheave members constitute a belt groove around which the belt is wound. The compression coil spring urges the second sheave member toward the first sheave member. The restricting member is disposed outside the compression coil spring. The restricting member has a stopper surface in contact with or opposed to at least part of the compression coil spring in the direction of compression except both ends of the compression coil spring.

The invention reduces vibration of the CVT while the engine runs at high rpm.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 4($a$) is a sectional view of a secondary sheave of a conventional engine unit described in WO2003-085278 in an uncompressed state, and FIG. 4($b$) is a sectional view of the secondary sheave of WO2003-085278 in a compressed state.

FIG. 5($a$) is a sectional view of a secondary sheave according to the invention in an uncompressed state, and FIG. 5($b$) is a sectional view of the secondary sheave according to the invention in a compressed state.

FIG. 6($a$) is a sectional view of a modified secondary sheave according to the invention in an uncompressed state, and FIG. 6($b$) is a sectional view of a modified secondary sheave according to the invention in a compressed state.

DETAILED DESCRIPTION OF THE INVENTION

The cause of vibration of a belt-type continuously variable transmission (CVT) while the engine runs at high rpm was previously not solved. The inventor investigated this phenomenon and found for the first time that the vibration is caused by buckling deformation of the coil spring during compression or decompression, and has thus developed the following invention.

A motorcycle 1 according to an embodiment of the invention is described with reference to FIGS. 1-5. Motorcycle 1 is described as an off-road motorcycle, however, a straddle-type vehicle according to the invention is not so limited. It may be, for example, a motorcycle type, scooter type or moped type motorcycle, or it may be a straddle-type vehicle other than a motorcycle such as an all terrain vehicle (ATV).

[Schematic Structure of Motorcycle 1]

Figure 1:
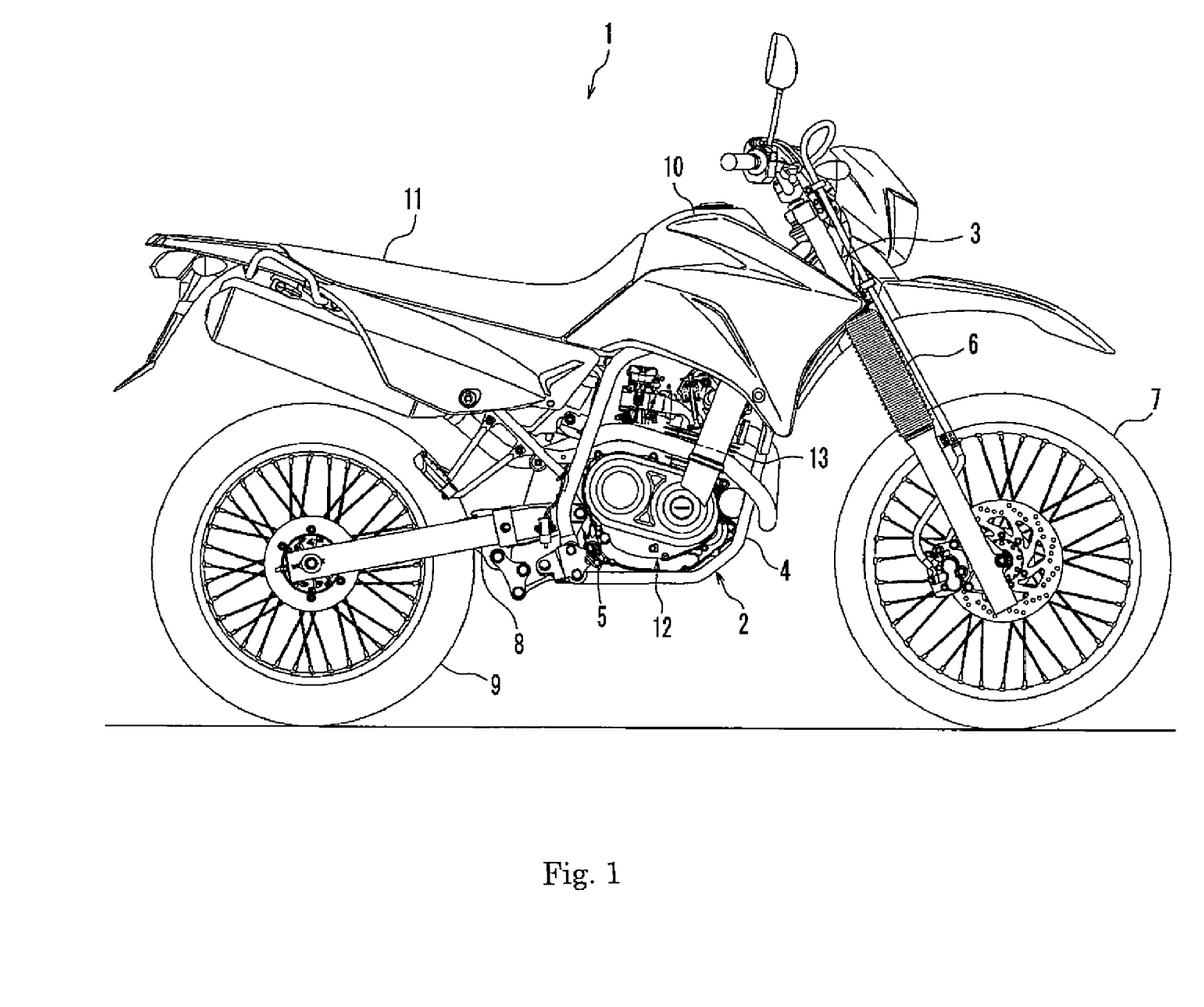
FIG. 1 is a side view of a motorcycle according to an embodiment of the invention.

The schematic structure of motorcycle 1 is described with reference to FIG. 1. In the following description, "front", "back", "right" and "left" indicate directions from the perspective of a driver in a seat 11 of motorcycle 1.

Motorcycle 1 has a body frame 2. Body frame 2 includes a head pipe 3, a down tube 4 and a seat pillar 5. Down tube 4 extends downward from head pipe 3. Seat pillar 5 extends backward from head pipe 3. The lower end of head pipe 3 is connected to a front wheel 7 via a front fork 6. A rear arm 8 extending backward is supported at the lower end of seat pillar 5. The rear end of rear arm 8 is connected to a rear wheel 9. A cover 10 covers body frame 2, and seat 11 is slightly to the rear of the center of cover 10.

Figure 2:
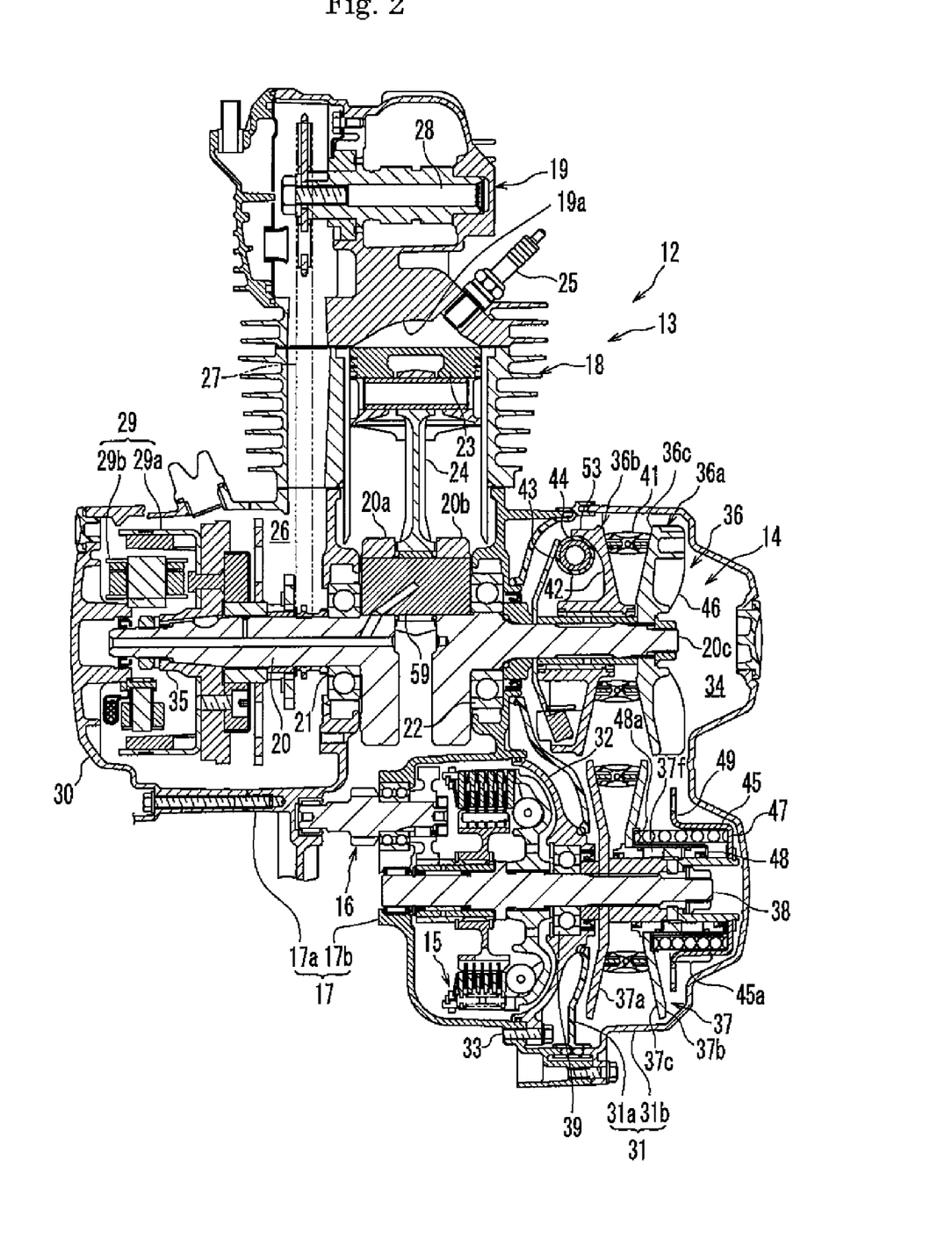
FIG. 2 is a sectional view of an engine unit of the motorcycle of FIG. 1.

An engine unit 12 is disposed between and supported by down tube 4 and seat pillar 5. As shown in FIG. 2, engine unit 12 comprises an engine 13, a CVT 14, a reduction mechanism 16 and other components. Driving force generated by engine unit 12 is transmitted to rear wheel 9 via power transmission means such as a chain belt. Here, engine 13 is depicted as a four-stroke single-cylinder engine, however, engine 13 may take other forms such as a two-stroke engine or a multi-cylinder engine.

[Structure of Engine Unit 12]

Engine unit 12 includes engine 13, CVT 14, a centrifugal clutch 15 and reduction mechanism 16. The structure of part of reduction mechanism 16 is omitted in FIG. 2 for illustrative purposes.

Engine 13 includes a crankcase 17, a substantially cylindrical cylinder 18 and a cylinder head 19. Crankcase 17 comprises a first case block 17$a$ on the left and a second case block 17$b$ on the right. First case block 17$a$ and second case block 17$b$ abut in the direction of breadth of motorcycle 1. Cylinder 18 is connected obliquely to the front upper part of crankcase 17, and cylinder head 19 is connected to one end of cylinder 18.

Crankcase 17 accommodates a crankshaft 20 extending horizontally along the breadth of motorcycle 1. Crankshaft 20 is supported by first case block 17$a$ and second case block 17$b$ with bearings 21 and 22 therebetween.

Cylinder 18 accommodates a slidable piston 23. An end of piston 23 adjacent to crankshaft 20 is connected to one end of a connecting rod 24. The other end of connecting rod 24 is connected to a crank pin 59 disposed between left crank arm 20$a$ and right crank arm 20$b$ of crankshaft 20. Thus, piston 23 reciprocates in cylinder 18 with rotation of crankshaft 20.

Cylinder head 19 has a recess 19$a$ communicating with the internal space of cylinder 18 and intake and exhaust ports communicating with recess 19$a$. Cylinder head 19 accommodates an ignition plug 25 such that an igniter at the end is exposed to recess 19$a$.

Cylinder 18 has at the left a cam chain chamber 26 that communicates the interior of crankcase 17 with the interior of cylinder head 19. Cam chain chamber 26 accommodates a timing chain 27 that is wound around crankshaft 20 and a cam shaft 28. Thus, cam shaft 28 rotates with rotation of crankshaft 20 so that inlet and exhaust valves are switched over.

A generator case 30 accommodating a generator 29 is mounted detachably on the left of the front half of first case block 17$a$. A transmission case 31 accommodating CVT 14 is mounted on the right of second case block 17$b$.

The right side of the rear half of second case block 17$b$ has an opening that is closed by a clutch cover 32. Clutch cover 32 is detachably attached to second case block 17$b$ with a bolt 33.

Transmission case 31 is separate from crankcase 17 and is composed of an inner case 31$a$ that covers the inside (the left side) of CVT 14 in the direction of breadth of motorcycle 1, and an outer case 31$b$ that covers the outside (the right side) of CVT 14 in the direction of breadth of motorcycle 1. Inner case 31$a$ is mounted on the right of crankcase 17, while outer case 31$b$ is mounted on the right of inner case 31$a$. Outer case 31$b$ and inner case 31$a$ constitute a belt chamber 34.

The left end of crankshaft 20 reaches the interior of generator case 30 through first case block 17$a$. Generator 29 is mounted to the left end of crankshaft 20 and includes a rotor 29$b$ opposed to a stator 29$a$. Stator 29$a$ is fixed to generator case 30 so as not to be rotated and displaced. Rotor 29$b$ is unrotatably fixed to a sleeve 35 that rotates with crankshaft 20. Thus, rotor 29$b$ rotates with respect to stator 29$a$ with rotation of crankshaft 20 to generate power.

Belt chamber 34 accommodates CVT 14. CVT 14 includes a primary sheave 36 and a secondary sheave 37 located at the rear of primary sheave 36. Crankshaft 20 passes through second case block 17b and inner case 31a into belt chamber 34. The right part of crankshaft 20 (strictly, the part on the right of bearing 22) constitutes a primary sheave shaft 20c. Primary sheave 36 is supported by primary sheave shaft 20c and thus rotates with rotation of crankshaft 20.

The rear half of transmission case 31 accommodates a secondary sheave shaft 38 passing through inner case 31a and clutch cover 32 into crankcase 17. Secondary sheave shaft 38 is mounted to clutch cover 32 with a bearing 39 therebetween and supports secondary sheave 37 in belt chamber 34.

A V-belt (for example, a resin block V-belt) 41 is wound around secondary sheave 37 and primary sheave 36. When primary sheave 36 rotates with crankshaft 20, its torque is transmitted to secondary sheave 37 via V-belt 41 to rotate secondary sheave shaft 38 with secondary sheave 37. Rotation of secondary sheave shaft 38 is transmitted to rear wheel 9 via centrifugal clutch 15, reduction mechanism 16 and power transmission means such as a belt or a chain.

[Concrete Structure of CVT 14]

The structure of CVT 14 is described in more detail with reference to FIG. 2. As described above, CVT 14 includes primary sheave 36, secondary sheave 37 and V-belt 41. Primary sheave 36 includes a tapered fixed sheave member 36a and a tapered moving sheave member 36b. Fixed sheave member 36a is fixed to the right end of primary sheave shaft 20c and extends radially outward towards the outside (to the right) in the direction of breadth of motorcycle 1, and rotates with primary sheave shaft 20c. Moving sheave member 36b is opposed to fixed sheave member 36a at a position closer to the center (to the left) with respect to fixed sheave member 36a, and extends radially outward towards the inside (to the left) in the direction of breadth of motorcycle 1. Moving sheave member 36b is mounted to primary sheave shaft 20c so as to be unrotatable but slidable in the axial direction. That is, fixed sheave member 36a and moving sheave member 36b constitute a V-cross-section belt groove 36c around which V-belt 41 is wound. The width of belt groove 36c can be varied by displacement of moving sheave member 36b relative to fixed sheave member 36a.

A cooling fan 46 is provided on the outside (right side in FIG. 2) of fixed sheave member 36a. The left side surface of moving sheave member 36b has a plurality of cam surfaces 42 extending radially. A cam plate 43 facing cam surfaces 42 is provided on the left of moving sheave member 36b. A plurality of substantially cylindrical (or substantially columnar) roller weights (pressure members) 44 is provided between cam plate 43 and cam surfaces 42. Roller weights 44 can be displaced radially but not circumferentially. Cam surfaces 42 are tapered radially outward from the center towards cam plate 43. Cam plate 43 is also tapered radially outward from the center towards cam surfaces 42. Thus, the distance between cam plate 43 and cam surfaces 42 decreases in a radially outward direction.

Secondary sheave 37 includes a fixed sheave member 37a located inside in the direction of breadth of motorcycle 1 and a moving sheave member 37b located outside in the direction of breadth of motorcycle 1 and opposed to fixed sheave member 37a. Fixed sheave member 37a is fixed to secondary sheave shaft 38 and extends radially outward towards the inside (to the left) in the direction of breadth of motorcycle 1, and rotates with secondary sheave shaft 38. Moving sheave member 37b is fixed to secondary sheave shaft 38 and extends radially outward towards the outside (to the right) in the direction of breadth of the vehicle. Moving sheave member 37b is mounted to secondary sheave shaft 38 so as to be unrotatable but slidable in the axial direction. That is, fixed sheave member 37a and moving sheave member 37b constitute a V-cross-section belt groove 37c around which V-belt 41 is wound. The width of belt groove 37c is varied by displacement of moving sheave member 37b relative to fixed sheave member 37a. V-belt 41 has a trapezoidal cross section that decreases in width inward along belt grooves 36c and 37c.

Figure 3:
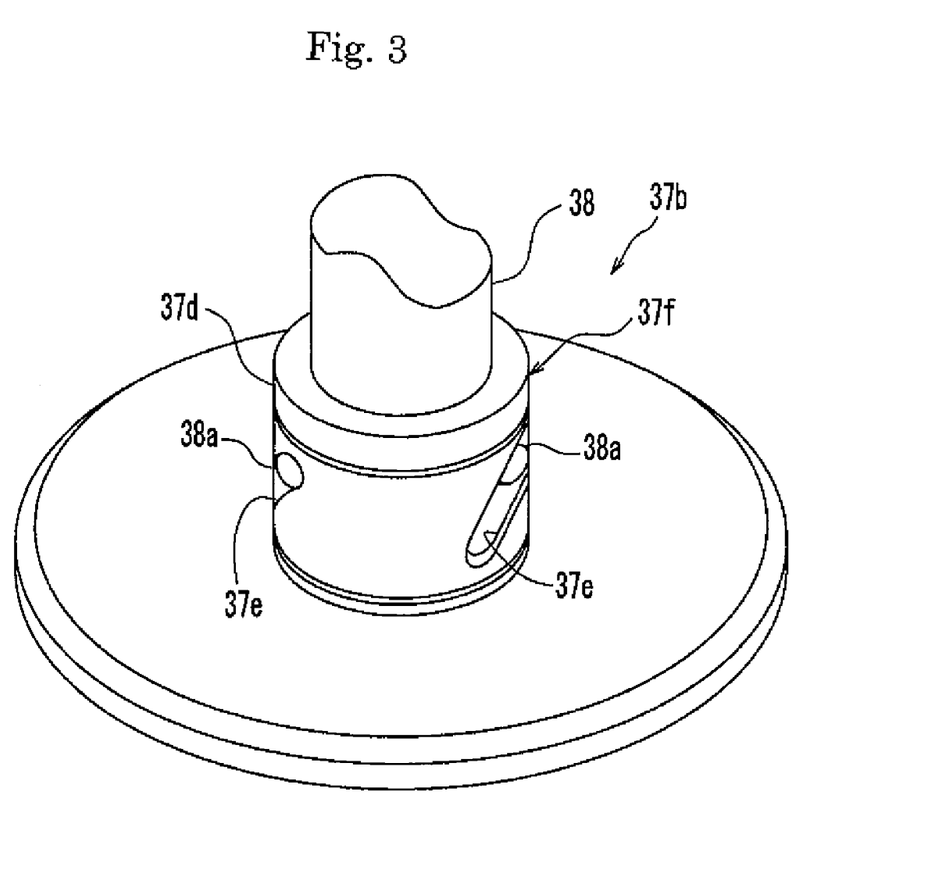
FIG. 3 is a perspective view of a secondary moving sheave member of the engine unit of FIG. 2.

FIG. 3 is a perspective view of secondary moving sheave member 37b. Secondary moving sheave member 37b has a boss 37f. Boss 37f has an opening with an inside diameter substantially equal to the outside diameter of secondary sheave shaft 38, in which secondary sheave shaft 38 is fitted. Boss 37f has a plurality of engaging holes 37e at regular intervals on its circumference Engaging holes 37e extend at an angle with respect to the axis of secondary sheave shaft 38 as viewed from the side. Secondary sheave shaft 38 has substantially circular-cross-section engaging protrusions 38a that engage engaging holes 37e to mount secondary moving sheave member 37b to secondary sheave shaft 38. Therefore, secondary moving sheave member 37b is rotated about secondary sheave shaft 38 with axial movement of secondary sheave shaft 38. A compression coil spring 45 is wound with a direction of winding from an end adjacent to secondary fixed sheave member 37a that is the same as a direction of rotation of secondary moving sheave member 37b which goes away from secondary fixed sheave member 37a. Thus, a torque cam mechanism is achieved.

As shown in FIG. 2, a substantially cylindrical inside spring guide 48 with an inside diameter substantially equal to the outside diameter of boss 37f of secondary moving sheave member 37b is fitted on boss 37f. A flange 48a in contact with secondary moving sheave member 37b is provided at the left end of inside spring guide 48 adjacent to secondary moving sheave member 37b.

A spring stopper 47 is mounted at the right end of secondary sheave shaft 38 and cannot be moved relative to secondary fixed sheave member 37a along the axis of secondary sheave shaft 38. Compression coil spring 45 is disposed in a compressed state between spring stopper 47 and secondary moving sheave member 37b and accommodates inside spring guide 48. The end of spring 45 adjacent to secondary moving sheave member 37b abuts flange 48a of inside spring guide 48.

Thus, secondary moving sheave member 37b is urged to secondary fixed sheave member 37a together with inside spring guide 48. Inside spring guide 48 is substantially fixed to secondary moving sheave member 37b.

The end of compression coil spring 45 adjacent to spring stopper 47 is pressed against spring stopper 47 by the urging force of spring 45 and is unrotatable about spring stopper 47. The end of spring 45 adjacent to secondary moving sheave member 37b is pressed against inside spring guide 48 by the urging force of spring 45 and is unrotatable about inside spring guide 48. Inside spring guide 48 is unrotatable about secondary moving sheave member 37b by the urging force of spring 45 and frictional force between inside spring guide 48 and secondary moving sheave member 37b.

Compression coil spring 45 is compressed and twisted by displacement of secondary moving sheave member 37b in a direction away from secondary fixed sheave member 37a. Specifically, spring 45 is wound such that a direction of winding from an end adjacent to secondary fixed sheave member 37a is the same as a direction of rotation of secondary moving sheave member 37b when it goes away from secondary fixed sheave member 37a. Thus, spring 45 is compressed and twisted in a direction to increase in diameter as secondary moving sheave member 37b separates from secondary fixed sheave member 37a.

Spring stopper 47 is integrated with a substantially tubular (specifically, substantially cylindrical) outside spring guide 49 serving as a restricting member that encloses compression coil spring 45. Specifically, outside spring guide 49 has a tubular portion that encloses spring 45 which continues to spring stopper 47 and a flange at the end of the tubular portion adjacent to secondary moving sheave member 37b. Thus, both an outside spring guide 49 is disposed outside spring 45 and an inside spring guide 48 is disposed inside spring 45. This guides and achieves smooth compression and decompression of spring 45.

Outside spring guide 49 has a stopper surface 50 that is in contact with or opposed to at least part of main portion 45a, which is the portion of compression spring 45 except for its ends, in the direction of compression. Stopper surface 50 abuts at least part of main portion 45a in the direction of compression when spring 45 is compressed. The axial length of outside spring guide 49 is set at one third or more (preferably, one half or more, and more preferably, two thirds or more that allows outside spring guide 49 to reach the center of compressed spring 45) of the length of spring 45 in its most compressed state in the direction of compression (along the axis of secondary sheave shaft 38). The axial length of outside spring guide 49 is set at a length such that one end 45b of spring 45 is not enclosed by outside spring guide 49 when spring 45 is in its most compressed state (see FIG. 5). That is, the axial length of outside spring guide 49 is set at a length such that the entire portion of spring 45 except end 45b is enclosed by outside spring guide 49 when spring 45 is in its most compressed state.

Main portion 45a of compression coil spring 45 is a portion, except the ends, comprising about 5% (preferably, 10%) of the entire length of spring 45 in the direction of compression. Specifically, main portion 45a is the portion of spring 45 except about two turns at each end of spring 45.

The inside diameter of outside spring guide 49 is set so that compression coil spring 45 abuts the inner surface of outside spring guide 49 when compressed (at least when spring 45 is most compressed).

Outside and inside spring guides 49 and 48 are preferably made of a material having sufficient strength to abut compression coil spring 45 when spring 45 is compressed. For example, spring guides 48 and 49 may be made of a metal such as iron, stainless steel or aluminum. The inner surfaces of metallic spring guides 48 and 49 may be coated with an elastic material such as rubber or resin to prevent interference between the metals.

[Action, Operation, and Advantages of CVT 14]

The action of CVT 14 and the operation and advantages of this embodiment will be described. The speed change ratio of CVT 14 depends on the ratio of the pressure of roller weights 44 that presses primary moving sheave member 36b toward primary fixed sheave member 36a to the force of compression coil spring 45 that urges secondary moving sheave member 37b toward secondary fixed sheave member 37a.

More specifically, when the rotation speed of engine 13 (specifically, the rotation speed of crankshaft 20=the rotation speed of primary sheave shaft 20c) is low, roller weights 44 are not subjected to a large centrifugal force. Therefore, secondary moving sheave member 37b is pressed towards secondary fixed sheave member 37a by the urging force of compression coil spring 45, so that belt groove 37c of secondary sheave 37 is held narrow in width. Thus, the belt winding diameter of secondary sheave 37 is held relatively large (see the state of secondary sheave 37 shown above secondary sheave shaft 38 in FIG. 2 (in the position of maximum speed change ratio)). In this state, V-belt 41 presses primary moving sheave member 36b to primary fixed sheave member 36a because V-belt 41 is drawn to secondary sheave 37. This increases the width of belt groove 36c of primary sheave 36, thus relatively decreasing the belt winding diameter of primary sheave 36 (see the state of primary sheave 36 shown below primary sheave shaft 20c in FIG. 2 (in the position of maximum speed change ratio)). As a result, the speed change ratio is increased.

On the other hand, when the rotation speed of primary sheave shaft 20c increases, roller weights 44 move radially outward by centrifugal force. The distance between primary moving sheave member 36b and cam plate 43 decreases radially outward. Therefore, primary moving sheave member 36b is pressed toward primary fixed sheave member 36a (rightward) as roller weights 44 move radially outward. Then, primary moving sheave member 36b slides to primary fixed sheave member 36a to narrow belt groove 36c (see the state of primary sheave 36 shown above primary sheave shaft 20c in FIG. 2 (in the position of minimum speed change ratio)). This increases the belt winding diameter of primary sheave 36. Thus, V-belt 41 is drawn to primary sheave 36, and presses secondary moving sheave member 37b in the direction away from secondary fixed sheave member 37a (rightward) against the urging force of compression coil spring 45. Thus, secondary moving sheave member 37b slides in a direction away from secondary fixed sheave member 37a to decrease the belt winding diameter of secondary sheave 37 (see the state of secondary sheave 37 shown below secondary sheave shaft 38 in FIG. 2 (in the position of minimum speed change ratio)). As a result, the speed change ratio is decreased.

As described above, as shown in FIG. 3, secondary moving sheave member 37b and secondary sheave shaft 38 are coupled by the engagement of engaging protrusions 38a and engaging holes 37e. Therefore, when secondary moving sheave member 37b slides in a direction away from secondary fixed sheave member 37a, secondary moving sheave member 37b slides along the axis of secondary sheave shaft 38 while rotating around secondary sheave shaft 38. Here, the end of compression coil spring 45 adjacent to spring stopper 47 cannot rotate with respect to spring stopper 47 by the urging force of spring 45. The end of spring 45 adjacent to secondary moving sheave member 37b cannot rotate with respect to inside spring guide 48 by the urging force of spring 45. Inside spring guide 48 cannot rotate with respect to secondary moving sheave member 37b by the urging force of spring 45. Thus, since secondary moving sheave member 37b slides while rotating along the axis of secondary sheave shaft 38, spring 45 is twisted. Specifically, when secondary moving sheave member 37b slides in a direction away from secondary fixed sheave member 37a, spring 45 is twisted in a direction to increase in diameter. For example, when spring 45 is most compressed, main portion 45a of spring 45 expands to about 1.4 times that in an uncompressed state.

Figure 4:
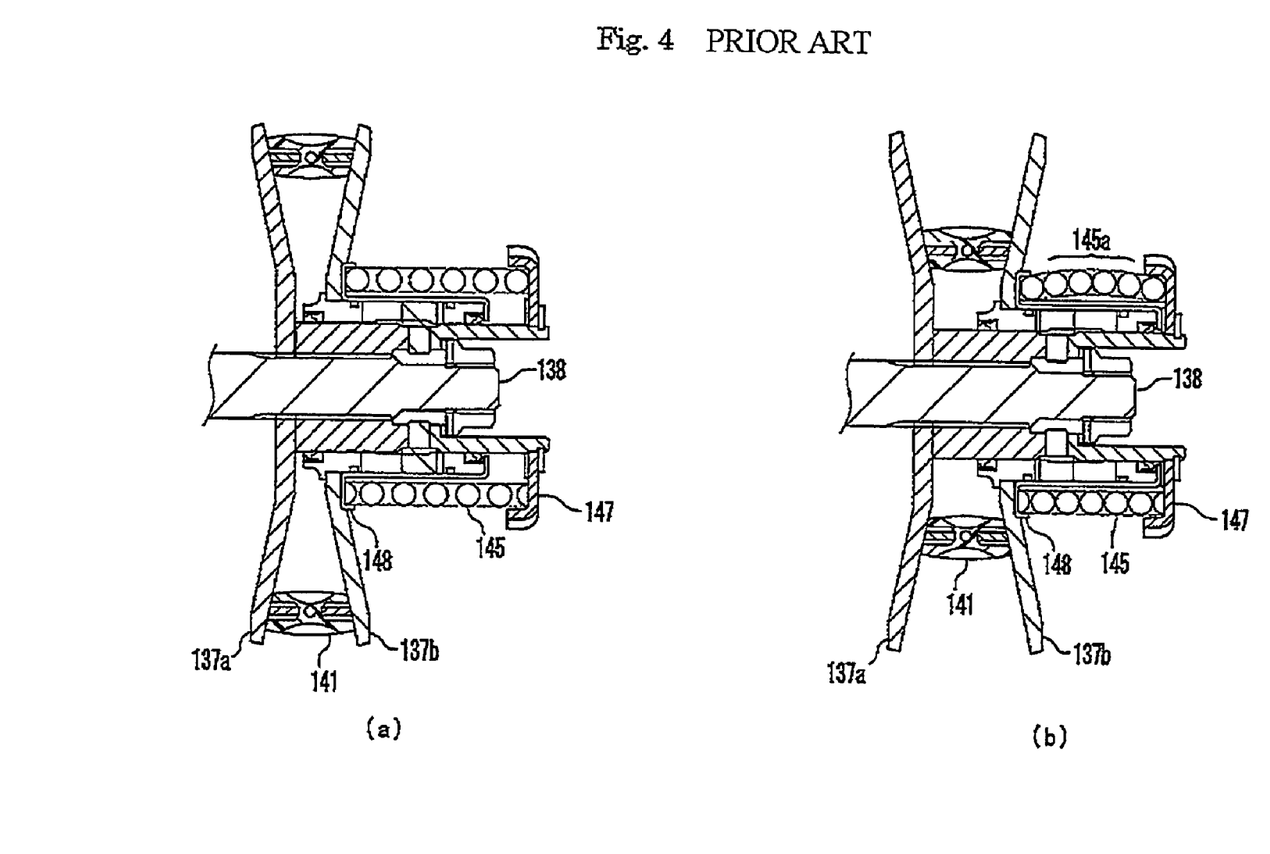

For example, with a conventional CVT 114 as shown in FIGS. 4 and 7, which does not have an outside spring guide 49 serving as a restricting member, compression coil spring 145 (particularly, main portion 145a) is buckled (off-centered) when compressed because outward deformation of spring 145 is not restricted. Thus, centrifugal force applied to spring 145 with rotation of secondary sheave 137 causes spring 145 to vibrate and interfere with neighboring components such as an inside spring guide 148. This generates noise and may damage components neighboring spring 145, such as inside spring guide 148, thereby decreasing stability and performance of CVT 114. The inventor has found the vibration and buckling of the pressure coil spring for the first time, and has provided outside spring guide 49 to restrict buckling when the spring is decompressed or compressed, as shown in FIGS. 2 and 5.

Figure 5:
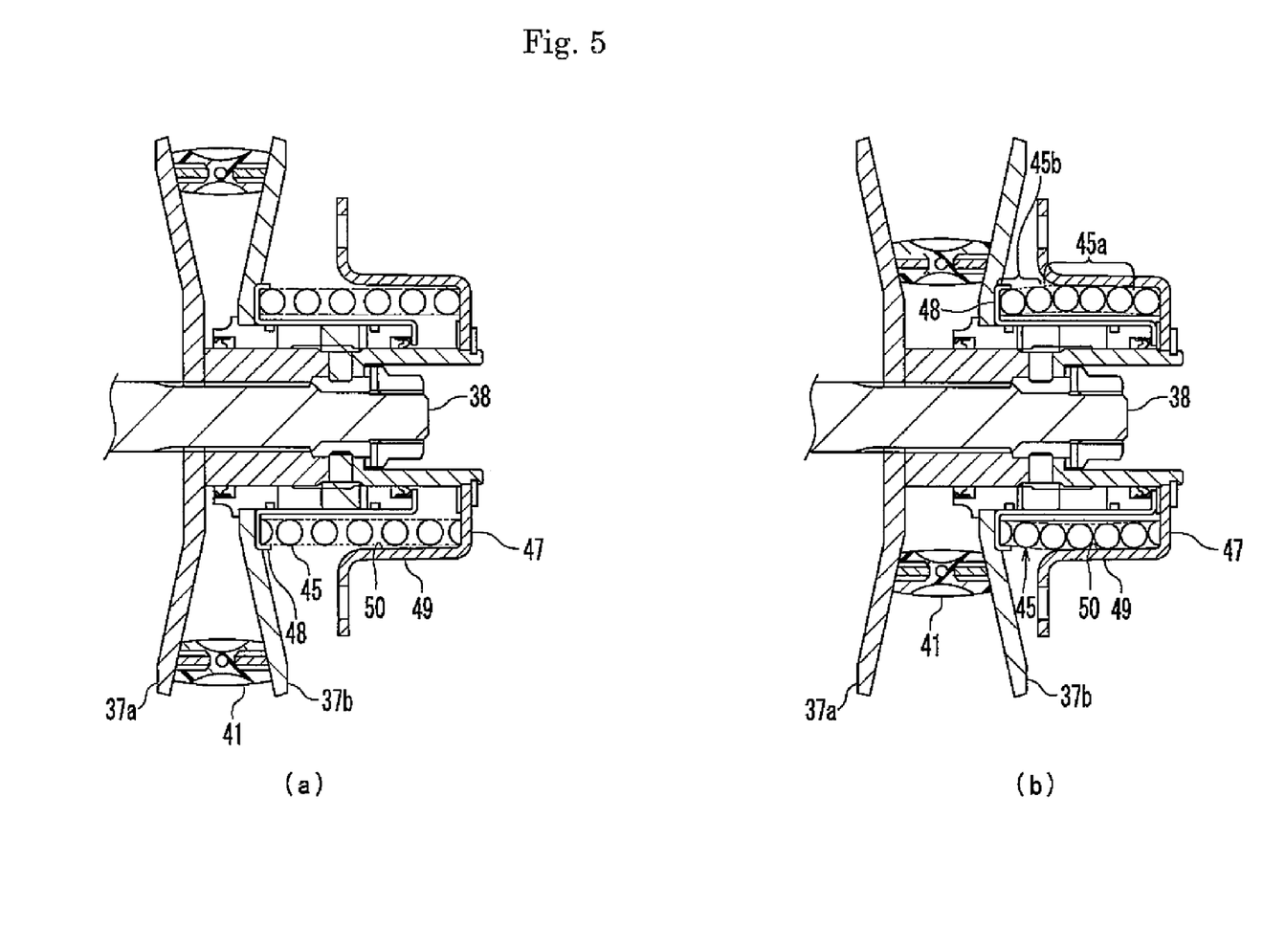

As shown in FIGS. 2 and 5, outside spring guide 49 restricts buckling when compression coil spring 45 is compressed and prevents vibration of spring 45, thus reducing noise caused by vibration of spring 45 and damage to neighboring components such as inside spring guide 48, and improving the stability and performance of CVT 14.

More specifically, in this embodiment, the substantially tubular or cylindrical outside spring guide 49 encloses compression coil spring 45. The inside diameter of outside spring guide 49 is set so that stopper surface 50 abuts at least part of main portion 45a in the direction of compression when spring 45 is compressed. Accordingly, outside spring guide 49 prevents spring 45 from increasing in diameter during compression. That is, spring 45 can increase in diameter only to the portion along the inner circumference of outside spring guide 49. This effectively prevents buckling of spring 45 during compression, reduces noises caused by vibration of spring 45 and damage to neighboring components such as inside spring guide 48, and improves the stability and performance of CVT 14.

Even if buckling of compression coil spring 45 during compression cannot be prevented completely, vibration of spring 45 can be prevented by interaction of the force of spring 45 to increase in diameter when compressed and the reaction force applied from outside spring guide 49 against it, provided that part of spring 45 during compression is in contact with outside spring guide 49. That is, vibration of spring 45 is always reduced as long as outside spring guide 49 is in contact with at least part of spring 45 in the direction of compression.

Outside spring guide 49 may be in contact with at least part of the circumference of compression coil spring 45 during compression. In order to eliminate vibration of spring 45 by restricting buckling of spring 45 during compression, outside spring guide 49 is preferably in contact with the entire circumference of compressed spring 45.

Furthermore, the central axis of outside spring guide 49 preferably agrees with the central axis of compression coil spring 45, and the inner wall of outside spring guide 49 is preferably point-symmetrical with the central axis in the cross section perpendicular to the central axis (for example, circular or regular polygonal). This effectively prevents buckling and eliminates vibration of spring 45 during compression.

In order to prevent vibration of compression coil spring 45, outside spring guide 49 is preferably in contact with at least part of main portion 45a in the direction of compression. Furthermore, outside spring guide 49 is preferably in contact with at least part of the central portion of spring 45 in the direction of compression (the part about one third of the length of spring 45 about the central portion in the compressing direction). If main portion 45a (particularly, the central portion) of spring 45 is greatly off-centered during compression, it can act as a source of vibration. Therefore holding at least part of main portion 45a (particularly, the central portion) in the direction of compression more effectively prevents vibration of spring 45.

Specifically, the axial length of outside spring guide 49 is preferably set at one third or more of the length of compression coil spring 45 in a compressed state preferably, one half or more, and more preferably, two thirds or more that allows outside spring guide 49 to reach the center of compressed spring 45).

In this case, the axial length of outside spring guide 49 is preferably not set to enclose the entire compression coil spring 45 in a compressed state. This is because if the entire spring 45 in a compressed state is enclosed by and in contact with outside spring guide 49, an extremely great reaction force is applied to outside spring guide 49. The axial length of outside spring guide 49 is thus preferably set such that one end 45b of spring 45 is not enclosed by outside spring guide 49 when spring 45 is most compressed. For example, the axial length of outside spring guide 49 is preferably set to enclose all of spring 45 except end 45b when spring 45 is most compressed.

The entire main portion 45a of compression coil spring 45 is preferably in contact with outside spring guide 49. However, vibration of spring 45 is sufficiently prevented even when part (for example, one to several turns) of main portion 45a during compression abuts outside spring guide 49.

Another method for preventing damage to inside spring guide 48 due to vibration of compression coil spring 45 is to dispose spring 45 sufficiently apart from inside spring guide 48. In other words, the inside diameter of spring 45 may be set sufficiently larger than the outside diameter of inside spring guide 48. This structure prevents interference between spring 45 and inside spring guide 48 even if spring 45 vibrates. However, this also increases the outside diameter of spring 45, which increases the size and decreases the stability and performance of CVT 14.

In contrast, the method of the invention in which outside spring guide 49 is provided as a restricting member does not increase the size of secondary sheave 37 so much, thus achieving a compact CVT 14.

Outside spring guide 49 may be separate from the components of CVT 14 and centrifugal clutch 15. However, it is preferable that outside spring guide 49 be integrated with the components of CVT 14 and centrifugal clutch 15 in order to reduce the number of the components of CVT 14, thereby facilitating assembly of CVT 14 and reducing manufacturing cost. Specifically, outside spring guide 49 may be integrated with spring stopper (fixing member) 47.

Alternatively, outside spring guide 49 may be integrated with another neighboring component such as a component of centrifugal clutch 15. Inside spring guide 48 may be fixed to another neighboring component such as a component of centrifugal clutch 15. A modification in which outside spring guide 49 is fixed to inside spring guide 48 is now described.

[Modification]

Figure 6:
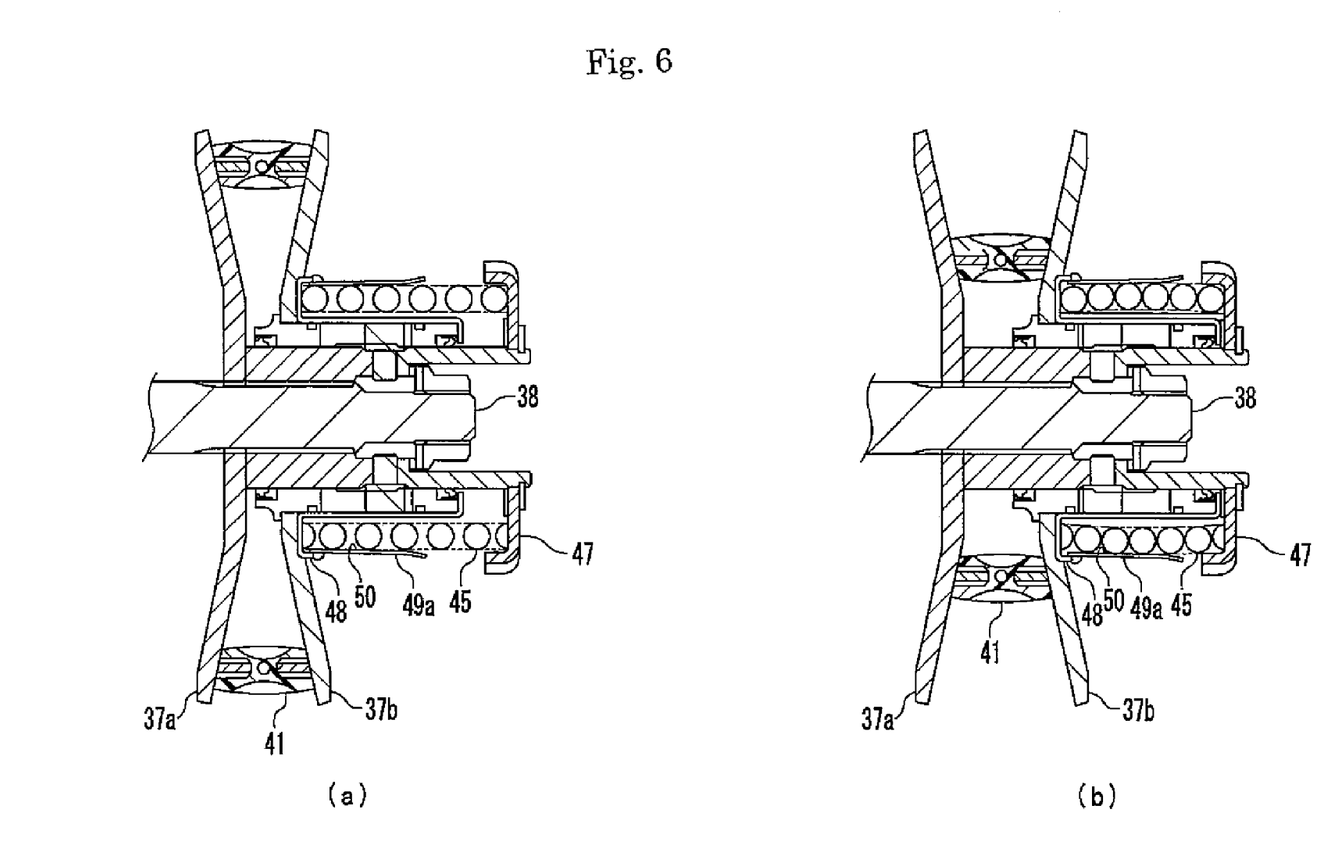

FIG. 6 illustrates a secondary sheave of a modified embodiment in cross section. Cylindrical outside spring guide 49a of this modified embodiment is mounted to secondary moving sheave member 37b so as not to be displaced. Specifically, inside spring guide 48 cannot be displaced with respect to secondary moving sheave member 37b by the urging force of compression coil spring 45. Outside spring guide 49a is mounted to inside spring guide 48.

This structure prevents vibration of compression coil spring 45 during compression as in the foregoing embodiment.

The foregoing embodiment and modification employ a structure in which a secondary moving sheave member is urged toward a secondary fixed sheave member using a compression coil spring. However, the invention is not limited to this structure. For example, the secondary moving sheave member may be urged by a helical tension spring.

Although the restricting member has been described as a substantially tubular outside spring guide 49, the restricting member is not limited to this structure, and may be any other structure that effectively prevents the coil spring from being deformed to buckle For example, the outside spring guide may be in contact with the spring during decompression or compression at different positions of the circumference of the main portion except both ends of the spring. Thus, the inner shape of the outside spring guide may be substantially polygonal or elliptical in cross section. The outside spring guide may be substantially tubular with at least part of a circumference cut off in the axial direction (for example, substantially C-shape in cross section). Furthermore, the outside spring guide may be composed of a plurality of members arranged around the outer circumference of the spring.

While this invention is particularly effective in a CVT that employs a torque cam mechanism, it can also be applied to a CVT that does not employ the torque cam mechanism.

The invention is useful for a straddle-type vehicle equipped with a belt-type continuously variable transmission.

The particular embodiments of the invention described in this document should be considered illustrative, rather than restrictive. Modification to the described embodiments may be made without departing from the spirit of the invention as defined by the following claims.

The invention claimed is:

1. A belt-type continuously variable transmission comprising a belt wound around a primary sheave and a secondary sheave, the secondary sheave comprising:
   a first sheave member;
   a second sheave member opposed to and displaced along an axis of the first sheave member to form a belt groove around which the belt is wound;
   a coil spring disposed coaxially with the second sheave member, at least partially uncovered at an end adjacent to the second sheave member, and urging the second sheave member toward the first sheave member; and
   a restricting member preventing the coil spring from buckling during decompression or compression, wherein the restricting member has a first annular portion extending across a plurality of turns of the coil spring, wherein
   in a most compressed state of the coil spring, one or more turns of the coil spring do not contact any member covering the coil spring.

2. The belt-type continuously variable transmission according to claim 1, wherein the coil spring is a compression coil spring.

3. The belt-type continuously variable transmission according to claim 2, wherein the restricting member is disposed outside the compression coil spring and abuts at least part of, but not both ends of, the compression coil spring in a direction of compression when the compression coil spring is compressed.

4. A belt-type continuously variable transmission comprising a belt wound around a primary sheave and a secondary sheave, the secondary sheave comprising:
   a first sheave member;
   a second sheave member opposed to and displaced along an axis of the first sheave member to form a belt groove around which the belt is wound;
   a compression coil spring disposed coaxially with the second sheave member, at least partially uncovered at an end adjacent to the second sheave member, and urging the second sheave member toward the first sheave member; and
   a restricting member disposed outside the compression coil spring and having a stopper surface that is in contact with or opposed to at least part of, but not both ends of, the compression coil spring in a direction of compression, wherein the restricting member has a first annular portion extending across a first plurality of turns of the coil spring, the restricting member preventing the compression coil spring from buckling during decompression or compression,
   wherein in an uncompressed state of the compression coil spring, the restricting member does not cover a second plurality of turns of the compression coil spring, and in a most compressed state of the compression coil spring, the restricting member covers the second turns.

5. The belt-type continuously variable transmission according to claim 4, wherein the restricting member abuts at least part of, but not both ends of, the compression coil spring in the direction of compression when the compression coil spring is compressed.

6. The belt-type continuously variable transmission according to claim 4, wherein the restricting member abuts at least part of the circumference of the compression coil spring when the compression coil spring is compressed.

7. The belt-type continuously variable transmission according to claim 4, wherein the restricting member abuts an entire circumference of the compression coil spring when the compression coil spring is compressed.

8. The belt-type continuously variable transmission according to claim 1, wherein the coil spring is twisted when compressed as the second sheave member is displaced in a direction away from the first sheave member.

9. The belt-type continuously variable transmission according to claim 4, wherein the coil spring is twisted when compressed as the second sheave member is displaced in a direction away from the first sheave member.

10. The belt-type continuously variable transmission according to claim 1, wherein the second sheave member is displaced while rotating in a direction away from the first sheave member, and the coil spring is wound from an end of the second sheave member with a winding direction that is the same as a direction of rotation when the second sheave member is displaced in the direction away from the first sheave member in a direction along the axis of the first sheave member.

11. The belt-type continuously variable transmission according to claim 4, wherein the second sheave member is displaced while rotating in a direction away from the first sheave member, and the coil spring is wound from an end of the second sheave member with a winding direction that is the same as a direction of rotation when the second sheave member is displaced in the direction away from the first sheave member.

12. The belt-type continuously variable transmission according to claim 1, wherein the restricting member is substantially tubular and surrounds the compression coil spring.

13. The belt-type continuously variable transmission according to claim 4, wherein the restricting member is substantially tubular and surrounds the compression coil spring.

14. The belt-type continuously variable transmission according to claim 13, wherein at least part of a circumference of the restricting member is cut off along an axis of the restricting member.

15. The belt-type continuously variable transmission according to claim 13, wherein the restricting member abuts at least part of the center of the compression coil spring in the direction of compression when the compression coil spring is compressed.

16. The belt-type continuously variable transmission according to claim 13, wherein the restricting member surrounds the entire coil spring except at least one end of the coil spring.

17. The belt-type continuously variable transmission according to claim 13, wherein a central axis of the restricting member agrees with a central axis of the compression coil spring.

18. The belt-type continuously variable transmission according to claim 1, wherein the secondary sheave further comprises a fixing member that contacts an end of the coil spring opposite to the second sheave member so as not to be displaced to the first sheave member along the axis of the secondary sheave, and the restricting member is integrated with the fixing member.

19. The belt-type continuously variable transmission according to claim 4, wherein the secondary sheave further comprises a fixing member that contacts an end of the coil spring opposite to the second sheave member so as not to be displaced to the first sheave member along the axis of the secondary sheave, and the restricting member is integrated with the fixing member.

20. The belt-type continuously variable transmission according to claim 1, wherein the restricting member is mounted to the second sheave member so as not to be displaced.

21. The belt-type continuously variable transmission according to claim 4, wherein the restricting member is mounted to the second sheave member so as not to be displaced.

22. The belt-type continuously variable transmission according to claim 1, wherein the primary sheave comprises:
another first sheave member rotating around the axis of rotation;
another second sheave member opposed to and displaced along an axis of the another first sheave member to form another belt groove around which the belt is wound; and
a pressure member pivoting around an axis of rotation with rotation of the another second sheave member and moving outward in a direction of a radius of the second sheave member while pressing the another second sheave member toward the another first sheave member by centrifugal force generated by the pivot to decrease a width of the another belt groove between the another second sheave member and the another first sheave member.

23. The belt-type continuously variable transmission according to claim 4, wherein the primary sheave comprises:
another first sheave member rotating around the axis of rotation;
another second sheave member opposed to and displaced along an axis of the another first sheave member to form another belt groove around which the belt is wound; and
a pressure member pivoting around an axis of rotation with rotation of the another second sheave member and moving outward in a direction of a radius of the second sheave member while pressing the another second sheave member toward the another first sheave member by centrifugal force generated by the pivot to decrease a width of the another belt groove between the another second sheave member and the another first sheave member.

24. A straddle-type vehicle comprising the belt-type continuously variable transmission according to claim 1.

25. A straddle-type vehicle comprising the belt-type continuously variable transmission according to claim 4.

26. The belt-type continuously variable transmission according to claim 1, wherein the restricting member has a second portion extending radially from an end of the first portion which overlap the turns of the coil spring radially, the second portion facing the second sheave member.

27. The belt-type continuously variable transmission according to claim 4, wherein the restricting member has a second portion extending radially from an end of the first portion which overlap the first turns of the coil spring radially, the second portion facing the second sheave member.

28. The belt-type continuously variable transmission according to claim 1, wherein the turns of the coil spring are sandwiched between the second sheave member and the restricting member.

29. The belt-type continuously variable transmission according to claim 4, wherein the first turns of the coil spring are sandwiched between the second sheave member and the restricting member.

30. The belt-type continuously variable transmission according to claim 4, wherein the second sheave member is displaced while rotating in a direction away from the first sheave member, and
the coil spring is wound from an end of the second sheave member with a winding direction that is the same as a direction of rotation when the second sheave member is displaced away from the first sheave member in a direction along the axis of the first sheave member.

31. The belt-type continuously variable transmission according to claim 1, wherein the coil spring is the only coil spring disposed around the second sheave member.

32. The belt-type continuously variable transmission according to claim 4, wherein the coil spring is the only coil spring disposed around the second sheave member.

33. The belt-type continuously variable transmission according to claim 1, wherein the second sheave member includes a moving sheave member, the moving sheave member including engaging holes, and a sheave shaft including protrusions wrapped around an outer circumference thereof and engageable with the engaging holes.

34. The belt-type continuously variable transmission according to claim 4, wherein the second sheave member includes a moving sheave member, the moving sheave member including engaging holes, and a sheave shaft including protrusions wrapped around an outer circumference thereof and engageable with the engaging holes.

35. A belt-type continuously variable transmission comprising a belt wound around a primary sheave and a secondary sheave, the secondary sheave comprising:
a first sheave member;
a second sheave member opposed to and displaced along an axis of the first sheave member to form a belt groove around which the belt is wound;
a coil spring disposed coaxially with the second sheave member, covered at an end adjacent to the second sheave member while leaving at least a portion of an opposite end of the coil spring uncovered; and
a restricting member preventing the coil spring from buckling during decompression or compression, wherein the restricting member having a first annular portion extending across a plurality of turns of the coil spring,
wherein in a most compressed state of the coil spring, one or more turns of the coil spring do not contact any member covering the coil spring.

* * * * *